United States Patent
Xu et al.

(10) Patent No.: US 12,090,467 B2
(45) Date of Patent: Sep. 17, 2024

(54) CATALYST FOR CATALYTIC REDUCTION OF INDUSTRIAL FLUE GAS $SO_2$ WITH CO TO PREPARE SULFUR, METHOD FOR PREPARING SAME AND USE THEREOF

(71) Applicants: NANJING TECH UNIVERSITY, Jiangsu (CN); NANJING GEKOF INSTITUTE OF ENVIRONMENTAL PROTECTION TECHNOLOGY & EQUIPMENT CO., LTD., Jiangsu (CN)

(72) Inventors: Haitao Xu, Nanjing (CN); Wenyu Ji, Nanjing (CN); Mutao Xu, Nanjing (CN); Qijie Jin, Nanjing (CN); Mingbo Li, Nanjing (CN); Jing Song, Nanjing (CN); Meng Xu, Nanjing (CN)

(73) Assignees: NANJING TECH UNIVERSITY, Nanjing (CN); NANJING GEKOF INSTITUTE OF ENVIRONMENTAL PROTECTION TECHNOLOGY & EQUIPMENT CO., LTD., Nanjing (CN)

(*) Notice: Subject to any disclaimer, the term of this patent is extended or adjusted under 35 U.S.C. 154(b) by 225 days.

(21) Appl. No.: 17/859,111

(22) Filed: Jul. 7, 2022

(65) Prior Publication Data
US 2023/0043657 A1 Feb. 9, 2023

(30) Foreign Application Priority Data
Jul. 30, 2021 (CN) .......................... 202110870394.6

(51) Int. Cl.
| | |
|---|---|
| *B01J 37/03* | (2006.01) |
| *B01D 8/00* | (2006.01) |
| *B01D 53/86* | (2006.01) |
| *B01J 23/10* | (2006.01) |
| *B01J 35/00* | (2024.01) |
| *B01J 35/23* | (2024.01) |
| *B01J 37/00* | (2006.01) |
| *B01J 37/02* | (2006.01) |
| *B01J 37/04* | (2006.01) |
| *B01J 37/08* | (2006.01) |
| *B01J 37/20* | (2006.01) |
| *C01B 17/04* | (2006.01) |

(52) U.S. Cl.
CPC ................ *B01J 23/10* (2013.01); *B01D 8/00* (2013.01); *B01D 53/8609* (2013.01); *B01J 35/23* (2024.01); *B01J 37/0036* (2013.01); *B01J 37/009* (2013.01); *B01J 37/0221* (2013.01); *B01J 37/0236* (2013.01); *B01J 37/031* (2013.01); *B01J 37/04* (2013.01); *B01J 37/08* (2013.01); *B01J 37/20* (2013.01); *C01B 17/0486* (2013.01); *B01D 2255/2061* (2013.01); *B01D 2255/2063* (2013.01)

(58) Field of Classification Search
CPC ........ B01J 23/10; B01J 35/23; B01J 37/0036; B01J 37/009; B01J 37/0221; B01J 37/0236; B01J 37/031; B01J 37/04; B01J 37/08; B01J 37/20; B01D 8/00; B01D 53/8609; C01B 17/0486
See application file for complete search history.

(56) References Cited

FOREIGN PATENT DOCUMENTS

| | | | | |
|---|---|---|---|---|
| CN | 107497453 A | * | 12/2017 | ......... B01D 53/8609 |
| CN | 108380220 A | | 8/2018 | |
| CN | 112169785 A | | 1/2021 | |
| WO | 91/12201 A1 | | 8/1991 | |

OTHER PUBLICATIONS

Abstract, English language abstract and translation of CN109999804B, published Jul. 17, 2020.

* cited by examiner

*Primary Examiner* — Yong L Chu
(74) *Attorney, Agent, or Firm* — Oliff PLC

(57) ABSTRACT

The present invention provides a catalyst for catalytic reduction of an industrial flue gas $SO_2$ with CO to prepare sulfur, a method for preparing the same and use thereof. A $CeO_2$ nanocarrier is prepared by using a hydrothermal method, La and Y are loaded as active components, pre-sulfurization is conducted with 6% of $SO_2$ and 3% of CO, and finally, the catalyst is prepared. The catalyst has high reactivity and sulfur selectivity and strong stability. The by-product sulfur generated by the reaction is recovered with a solvent $CS_2$, and the solvent $CS_2$ is recovered by using a distillation process. The preparation method is low in cost, causes no secondary pollution and is high in sulfur recovery rate. The problem of low sulfur production in China at present is solved.

14 Claims, 1 Drawing Sheet

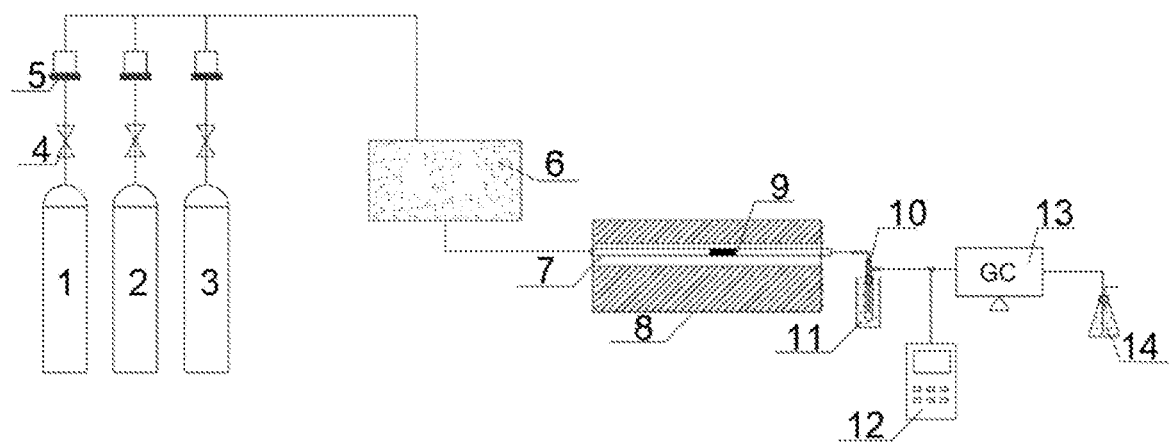

CATALYST FOR CATALYTIC REDUCTION OF INDUSTRIAL FLUE GAS $SO_2$ WITH CO TO PREPARE SULFUR, METHOD FOR PREPARING SAME AND USE THEREOF

TECHNICAL FIELD

The present invention relates to the field of atmospheric purification, and specifically relates to a catalyst for catalytic reduction of an industrial flue gas $SO_2$ with CO to prepare sulfur, a method for preparing the same and use thereof.

BACKGROUND

As a colorless and inflammable gas with a pungent odor, $SO_2$ is a major air pollutant with wide distribution and great harm. $SO_2$ is mainly produced by combustion of sulfur coal and petroleum, petroleum refining, non-ferrous metal metallurgy and manufacturing of sulfuric acid. With rapid development of a flue gas desulfurization industry, pollution caused by the industrial flue gas $SO_2$ is effectively controlled, and meanwhile, a large number of desulfurization by-products are also produced. According to different desulfurization processes, the desulfurization by-products mainly include gypsum obtained by using a wet desulfurization process and ash obtained by using a semi-dry desulfurization process. However, as the desulfurization processes have monotonous routes, no enough attention has been paid to disposal and consumption of the desulfurization by-products. In some power plants, the desulfurization by-product gypsum has nowhere to be consumed, and can only be stacked and discarded. As a large number of the by-products are still stacked in the open air, not only are land resources occupied, but also secondary pollution is caused to the environment. In addition, as the desulfurization by-products are not effectively used, waste of resources is caused.

At present, conventional desulfurization methods have relatively mature processes and stable desulfurization efficiency, but serious secondary pollution, equipment corrosion and other problems still exist. Catalytic reduction desulfurization refers to a process of reducing the industrial flue gas $SO_2$ in a flue gas to elemental sulfur with reducing agents such as CO, C, $H_2$, $H_2S$, etc. The flue gas contains a certain amount of the CO. In recent years, with development and application of new sulfur products such as polymerized sulfur, sulfur-coated urea and sulfur cement, the demand for sulfur in industries such as rubber, pesticides, building materials, textiles, chemical engineering, dyes and daily chemicals in China is rapidly increased, and the sulfur is widely used in paving asphalt. At present, the sulfur production in China is far from meeting the demand. Thus, a large amount of the sulfur is imported into China every year. According to a catalytic reduction desulfurization process, not only can the industrial flue gas $SO_2$ be effectively removed, but also secondary pollution cannot be caused by the produced sulfur, the problem of shortage of sulfur resources in China can be solved, and wastes are turned into treasures.

According to an invention patent titled "METHOD FOR PREPARING COMPOSITE CATALYST FOR CATALYTIC REDUCTION OF $SO_2$ WITH CO AND METHOD FOR RECOVERING SULFUR" (with a publication number of CN 107497453A), a method for preparing a composite catalyst for catalytic reduction of $SO_2$ with CO and a method for recovering sulfur are provided. According to the method, a perovskite-type composite catalyst $La_{1-x}Ce_xCoO_3$ ($0 \leq x \leq 1$) is prepared by using a microwave-assisted in-situ carbon template stabilization method. The composite catalyst has high activity stability and can be used for preparing the sulfur with high purity. However, as the elemental sulfur is mixed with the catalyst and then extracted, the method has a complicated process. According to an invention patent titled "CATALYST FOR REDUCTION OF $SO_2$ WITH CO, METHOD FOR PREPARING SAME AND USE THEREOF" (with a publication number of CN 109999804B), a catalyst for reduction of $SO_2$ with CO, a method for preparing same and use thereof are provided. According to the method, a lanthanum oxide and a cerium oxide are doped on the basis of an aluminum oxide carrier, and a certain amount of one or more of a zirconium oxide, an iron oxide, a manganese oxide, a cobalt oxide, a chromium oxide, a zinc oxide and a tin oxide are added to serve as a catalytic promoter. The catalyst has high catalytic activity and sulfur selectivity, but components of the catalyst are complex. The preparation method has a complicated preparation process and low economical efficiency.

SUMMARY

The present invention provides a catalyst for catalytic reduction of an industrial flue gas $SO_2$ with CO to prepare sulfur, a method for preparing the same and use thereof. A $CeO_2$ nanorod is prepared by using a hydrothermal method to serve as a carrier, the loading strength of active components is improved, and the active components La and Y are loaded on the $CeO_2$ nanocarrier by using an ammonia distillation method.

The objectives of the present invention may be achieved by the following technical solutions:

A method for preparing a catalyst for catalytic reduction of an industrial flue gas $SO_2$ with CO includes the following steps:

a) respectively dissolving $Ce(NO_3)_3 \cdot 6H_2O$ and NaOH in water to obtain a $Ce(NO_3)_3 \cdot 6H_2O$ aqueous solution and a NaOH aqueous solution, and slowly adding the NaOH aqueous solution dropwise into the $Ce(NO_3)_3 \cdot 6H_2O$ aqueous solution for uniform mixing to obtain a mixed solution 1;

b) dissolving cetyl trimethyl ammonium bromide (CTAB) and sodium dodecyl sulfonate (SDS) in water to obtain a solution, slowly adding the solution into the mixed solution 1 for stirring for 12-15 h, and conducting a hydrothermal reaction at a temperature of 100-110° C. for 24-26 h;

c) cooling a reactant obtained after the hydrothermal reaction in step b) to room temperature, filtering the cooled reactant to collect a white precipitate, and sequentially washing, drying and calcining the white precipitate to obtain a $CeO_2$ nanorod;

d) dissolving $La(NO_3)_3 \cdot 6H_2O$ and $Y(NO_3)_3 \cdot 6H_2O$ in water to obtain a mixed solution 2, and adjusting a pH of the mixed solution 2 to 11-12; adding the $CeO_2$ nanorod obtained in step c) into the mixed solution 2, placing the mixed solution 2 on a magnetic stirrer for stirring at a constant speed at 30-40° C. for about 4-6 h, heating the mixed solution to 80-90° C., and continuously stirring the mixed solution until the solution is neutral to obtain a catalyst; and drying the catalyst, and calcining the dried catalyst in an air atmosphere in a muffle furnace at 500-600° C. for 4-6 h to obtain a La—Y/$CeO_2$ catalyst; and e) pulverizing and sieving the La—Y/$CeO_2$ catalyst, placing particles with a particle size of 60-80 mesh in a quartz tube, and placing the quartz tube in an electric tube furnace; and then conducting sulfurization at 550-600° C. at a heating rate of 5-15° C./min in a mixed gas including 1-10% of CO, 1-10% of $SO_2$ and the balance of $N_2$ by volume at an air speed of 5,000-8,000 $h^{-1}$ for 1-4 h to obtain a target product sulfurized catalyst.

A catalyst for catalytic reduction of an industrial flue gas $SO_2$ with CO is prepared by using the following method:

a) respectively dissolving $Ce(NO_3)_3 \cdot 6H_2O$ and NaOH in water to obtain a $Ce(NO_3)_3 \cdot 6H_2O$ aqueous solution and a NaOH aqueous solution, and slowly adding the NaOH aqueous solution dropwise into the $Ce(NO_3)_3 \cdot 6H_2O$ aqueous solution for uniform mixing to obtain a mixed solution 1;

b) dissolving cetyl trimethyl ammonium bromide (CTAB) and sodium dodecyl sulfonate (SDS) in water to obtain a solution, slowly adding the solution into the mixed solution 1 for stirring for 12-15 h, and conducting a hydrothermal reaction at a temperature of 100-110° C. for 24-26 h;

c) cooling a reactant obtained after the hydrothermal reaction in step b) to room temperature, filtering the cooled reactant to collect a white precipitate, and sequentially washing, drying and calcining the white precipitate to obtain a $CeO_2$ nanorod;

d) dissolving $La(NO_3)_3 \cdot 6H_2O$ and $Y(NO_3)_3 \cdot 6H_2O$ in water to obtain a mixed solution 2, and adjusting a pH of the mixed solution 2 to 11-12; adding the $CeO_2$ nanorod obtained in step c) into the mixed solution 2, placing the mixed solution 2 on a magnetic stirrer for stirring at a constant speed at 30-40° C. for about 4-6 h, heating the mixed solution to 80-90° C., and continuously stirring the mixed solution until the solution is neutral to obtain a catalyst; and drying the catalyst, and calcining the dried catalyst in an air atmosphere in a muffle furnace at 500-600° C. for 4-6 h to obtain a La—Y/$CeO_2$ catalyst; and e) pulverizing and sieving the La—Y/$CeO_2$ catalyst, placing particles with a particle size of 60-80 mesh in a quartz tube, and placing the quartz tube in an electric tube furnace; and then conducting sulfurization at 550-600° C. at a heating rate of 5-15° C./min in a mixed gas including 1-10% of CO, 1-10% of $SO_2$ and the balance of $N_2$ by volume at an air speed of 5,000-8,000 $h^{-1}$ for 1-4 h to obtain a target product sulfurized catalyst.

In a technical solution of the present invention, in step a), a mass ratio of the $Ce(NO_3)_3 \cdot 6H_2O$ to the NaOH in the mixed solution is (0.1-5):(10-50).

In some preferred technical solutions, in step a), a mass ratio of the $Ce(NO_3)_3 \cdot 6H_2O$ to the NaOH in the mixed solution is (1.5-5):(10-40).

In a technical solution of the present invention, in step b), a mass ratio of the $Ce(NO_3)_3 \cdot 6H_2O$ to the CTAB to the SDS is (10-30):(0.1-3):(0.1-3).

In some preferred technical solutions, a mass ratio of the $Ce(NO_3)_3 \cdot 6H_2O$ to the CTAB to the SDS is (10-25):(0.5-1.5):(0.5-1.5).

In a technical solution of the present invention, in step d), a molar ratio of the $Ce(NO_3)_3 \cdot 6H_2O$ to the $La(NO_3)_3 \cdot 6H_2O$ to the $Y(NO_3)_3 \cdot 6H_2O$ is (6-12):(0.5-1.5):(1-3).

In step d), a molar ratio of the $CeO_2$ to the $La(NO_3)_3 \cdot 6H_2O$ to the $Y(NO_3)_3 \cdot 6H_2O$ is (6-12):(0.5-1.5):(1-3).

A method of using the catalyst prepared by using the method above in catalytic reduction of an industrial flue gas $SO_2$ with CO to prepare sulfur is provided. The method includes: placing 1 mL of a sulfurized catalyst in a 10 mm quartz tube, and placing the quartz tube in an electric tube furnace for a reaction at a temperature of 300-500° C. at a heating rate of 5-15° C./min in a flue gas including 0.5-4% of $SO_2$, 1-8% of CO and 88-98.5% of $N_2$ at a volumetric air speed of 12,000-15,000 $h^{-1}$; and discharging sulfur vapor from a gas outlet of the tube furnace, preserving heat of the sulfur vapor with a heating belt, and condensing the sulfur vapor into sulfur in a cold trap.

According to the method above, after the reaction is completed, 100-120 mL of $CS_2$ is added into the cold trap and shaken up and down for completely dissolving the sulfur in a $CS_2$ solution, an obtained mixed solution is placed in a distillation flask, and the distillation flask is heated at 50-60° C. in a water bath kettle. The $CS_2$ is vaporized after being heated to obtain vapor, and the vapor enters a condenser through a branch tube and is condensed in a conical flask. Sulfur obtained in the distillation flask is collected. Beneficial effects of the present invention:

(1) A catalytic reduction desulfurization process is simple, no secondary pollution is caused, and the elemental sulfur can be recovered to achieve the purpose of turning wastes into treasures. The desulfurization method is the best one for organically combining environmental benefits and resource benefits among various desulfurization technologies at present.

(2) China has concentrated distribution of rare earth reserves, accounts for a large proportion of total rare earth reserves, and is well-known as a rare earth country. Ceria is an oxide catalyst with the highest activity among rare earth oxides. During reduction of an industrial flue gas $SO_2$ with CO, the cheap and abundant nano-$CeO_2$ is used as a carrier to load La and Y, and great significance is brought to development of rare earth resources.

(3) The CTAB and the SDS are added in a certain amount in a strong alkali environment. The $CeO_2$ nanorod with specific morphology is prepared by using the hydrothermal method to serve as the carrier. The obtained catalyst has many oxygen vacancies, large specific surface area, high catalytic activity, a desulfurization rate of 96-98% and a sulfur recovery rate of 92-95%.

BRIEF DESCRIPTION OF THE DRAWINGS

FIG. 1 is a diagram showing a device used in the present invention.

Callouts in the FIGURE are as follows: 1, 99.999% of $N_2$; 2, 99.999% of $SO_2$; 3, 99.999% of CO; 4, pressure relief valve; 5, mass flowmeter; 6, mixing chamber; 7, quartz tube; 8, high-temperature tube furnace; 9, catalyst fixed bed; 10, cold trap; 11, ice water bath; 12, sulfur dioxide analyzer; 13, gas chromatograph; and 14, tail gas treatment unit.

DETAILED DESCRIPTION

The present invention is further described below with reference to embodiments, but the protection scope of the present invention is not limited thereto.

Example 1 a) 1.74 g of $Ce(NO_3)_3 \cdot 6H_2O$ and 16 g of NaOH were respectively dissolved in 35 mL and 30 mL of $H_2O$ to obtain a $Ce(NO_3)_3 \cdot 6H_2O$ solution and a NaOH solution. The NaOH solution was slowly added dropwise into the $Ce(NO_3)_3 \cdot 6H_2O$ solution to obtain a mixed solution. The mixed solution was stirred on a magnetic stirrer for 30 min to obtain a mixed solution 1.

b) 0.1 g of CTAB and 0.1 g of SDS were dissolved in 5 mL of distilled water to obtain a solution. The solution was added dropwise into the mixed solution 1 for stirring for 12 h and then loaded into an autoclave for a hydrothermal reaction at 110° C. for 24 h.

c) Cooling was conducted to room temperature. Filtration was conducted to collect a white precipitate. The white precipitate was washed to neutral with deionized water. The washed white precipitate was dried in a drying oven at 60° C. for 12 h and then calcined in a muffle furnace at 500° C. for 5 h to obtain a $CeO_2$ nanorod.

d) 0.31 g of $La(NO_3)_3 \cdot 6H_2O$ and 0.43 g of $Y(NO_3)_3 \cdot 6H_2O$ were dissolved in distilled water to obtain a mixed solution. 25% ammonia was added. Stirring was conducted for 2 h to adjust the pH of the mixed solution to 12 to obtain a mixed solution 2. 0.8 g of the $CeO_2$ nanorod was added into the mixed solution 2. The mixed solution 2 was placed on a magnetic stirrer for stirring at a constant speed at 30° C. for about 4 h and then heated to 80° C. Stirring was conducted continuously until the pH was 7 to obtain a catalyst. The catalyst was dried at 120° C. for 12 h and then calcined in an air atmosphere in a muffle furnace at 500° C. for 4 h to obtain a La—Y/$CeO_2$ catalyst. A molar ratio of the $CeO_2$ to the $La(NO_3)_3 \cdot 6H_2O$ to the $Y(NO_3)_3 \cdot 6H_2O$ was 6.5:1:1.6.

e) The pre-calcined catalyst was pulverized and sieved. 1.00 mL of particles with a particle size of 60 mesh were placed in a 10 mm quartz tube. The quartz tube was placed in an electric tube furnace. Sulfurization was conducted at 550° C. at a heating rate of 10° C./min in a mixed gas including 6% of CO, 3% of $SO_2$ and the balance of $N_2$ by volume at an air speed of 6,000 $h^{-1}$ for 2 h to obtain a sulfurized catalyst.

Example 2 a) 3.48 g of $Ce(NO_3)_3 \cdot 6H_2O$ and 32.0 g of NaOH were respectively dissolved in 70 mL and 60 mL of $H_2O$ to obtain a $Ce(NO_3)_3 \cdot 6H_2O$ solution and a NaOH solution. The NaOH solution was slowly added dropwise into the $Ce(NO_3)_3 \cdot 6H_2O$ solution to obtain a mixed solution. The mixed solution was stirred on a magnetic stirrer for 40 min to obtain a mixed solution 1.

b) 0.2 g of CTAB and 0.2 g of SDS were dissolved in 5 mL of distilled water to obtain a solution. The solution was added dropwise into the mixed solution 1 for stirring for 15 h and then loaded into an autoclave for a hydrothermal reaction at 110° C. for 26 h.

c) Cooling was conducted to room temperature. Filtration was conducted to collect a white precipitate. The white precipitate was washed to neutral with deionized water. The washed white precipitate was dried in a drying oven at 70° C. for 14 h and then calcined in a muffle furnace at 550° C. for 6 h to obtain a $CeO_2$ nanorod.

d) 0.31 g of $La(NO_3)_3 \cdot 6H_2O$ and 0.43 g of $Y(NO_3)_3 \cdot 6H_2O$ were dissolved in distilled water to obtain a mixed solution. 25% ammonia was added. Stirring was conducted for 2 h to adjust the pH of the mixed solution to 12 to obtain a mixed solution 2. 0.8 g of the $CeO_2$ nanorod was added into the mixed solution 2. The mixed solution 2 was placed on a magnetic stirrer for stirring at a constant speed at 30° C. for about 4 h and then heated to 90° C. Stirring was conducted continuously until the pH was about 7 to obtain a catalyst. The catalyst was dried at 120° C. for 12 h and then calcined in an air atmosphere in a muffle furnace at 600° C. for 4 h to obtain a La—Y/$CeO_2$ catalyst. A molar ratio of the $CeO_2$ to the $La(NO_3)_3 \cdot 6H_2O$ to the $Y(NO_3)_3 \cdot 6H_2O$ was 6.5:1:1.6.

e) The pre-calcined catalyst was pulverized and sieved. 1.00 mL of particles with a particle size of 80 mesh were placed in a 10 mm quartz tube. The quartz tube was placed in an electric tube furnace. The catalyst was sulfurized at 550° C. at a heating rate of 10° C./min in a mixed gas including 6% of CO, 3% of $SO_2$ and the balance of $N_2$ by volume at an air speed of 6,000 $h^{-1}$ for 2 h to obtain a sulfurized catalyst.

Example 3 a) 1.74 g of $Ce(NO_3)_3 \cdot 6H_2O$ and 16.0 g of NaOH were respectively dissolved in 35 mL and 30 mL of $H_2O$ to obtain a $Ce(NO_3)_3 \cdot 6H_2O$ solution and a NaOH solution. The NaOH solution was slowly added dropwise into the $Ce(NO_3)_3 \cdot 6H_2O$ solution to obtain a mixed solution. The mixed solution was stirred on a magnetic stirrer for 40 min to obtain a mixed solution 1.

b) 0.1 g of CTAB and 0.1 g of SDS were dissolved in 5 mL of distilled water to obtain a solution. The solution was added dropwise into the mixed solution 1 for stirring for 12 h and then loaded into an autoclave for a hydrothermal reaction at 110° C. for 24 h.

c) Cooling was conducted to room temperature. Filtration was conducted to collect a white precipitate. The white precipitate was washed to neutral with deionized water. The washed white precipitate was dried in a drying oven at 60° C. for 12 h and then calcined in a muffle furnace at 500° C. for 5 h to obtain a $CeO_2$ nanorod.

d) 0.25 g of $La(NO_3)_3 \cdot 6H_2O$ and 0.52 g of $Y(NO_3)_3 \cdot 6H_2O$ were dissolved in distilled water to obtain a mixed solution. 25% ammonia was added. Stirring was conducted for 2 h to adjust the pH of the mixed solution to 12 to obtain a mixed solution 2. 0.8 g of the $CeO_2$ nanorod was added into the mixed solution 2. The mixed solution 2 was placed on a magnetic stirrer for stirring at a constant speed at 30° C. for about 4 h and then heated to 80° C. Stirring was conducted continuously until the pH was about 7 to obtain a catalyst. The catalyst was dried at 120° C. for 12 h and then calcined in an air atmosphere in a muffle furnace at 500° C. for 4 h to obtain a La—Y/$CeO_2$ catalyst. A molar ratio of the $CeO_2$ to the $La(NO_3)_3 \cdot 6H_2O$ to the $Y(NO_3)_3 \cdot 6H_2O$ was 8.1:1:2.4.

e) The pre-calcined catalyst was pulverized and sieved. 1.00 mL of particles with a particle size of 60 mesh were placed in a 10 mm quartz tube. The quartz tube was placed in an electric tube furnace. The catalyst was sulfurized at 550° C. at a heating rate of 10° C./min in a mixed gas including 6% of CO, 3% of $SO_2$ and the balance of $N_2$ by volume at an air speed of 6,000 $h^{-1}$ for 2 h to obtain a sulfurized catalyst.

Example 4 a) 3.48 g of $Ce(NO_3)_3 \cdot 6H_2O$ and 32.0 g of NaOH were respectively dissolved in 70 mL and 60 mL of $H_2O$ to obtain a $Ce(NO_3)_3 \cdot 6H_2O$ solution and a NaOH solution. The NaOH solution was slowly added dropwise into the $Ce(NO_3)_3 \cdot 6H_2O$ solution to obtain a mixed solution. The mixed solution was stirred on a magnetic stirrer for 40 min to obtain a mixed solution 1.

b) 0.2 g of CTAB and 0.2 g of SDS were dissolved in 5 mL of distilled water to obtain a solution. The solution was added dropwise into the mixed solution 1 for stirring for 14 h and then loaded into an autoclave for a hydrothermal reaction at 110° C. for 26 h.

c) Cooling was conducted to room temperature. Filtration was conducted to collect a white precipitate. The white precipitate was washed to neutral with deionized water. The washed white precipitate was dried in a drying oven at 70° C. for 14 h and then calcined in a muffle furnace at 550° C. for 6 h to obtain a $CeO_2$ nanorod.

d) 0.24 g of $La(NO_3)_3 \cdot 6H_2O$ and 0.32 g of $Y(NO_3)_3 \cdot 6H_2O$ were dissolved in distilled water to obtain a mixed solution. 25% ammonia was added. Stirring was conducted for 2 h to adjust the pH of the mixed solution to 12 to obtain a mixed solution 2. 0.85 g of the $CeO_2$ nanorod was added into the mixed solution 2. The mixed solution 2 was placed on a magnetic stirrer for stirring at a constant speed at 30° C. for about 4 h and then heated to 90° C. Stirring was conducted continuously until the pH was about 7 to obtain a catalyst. The catalyst was dried at 120° C. for 12 h and then calcined in an air atmosphere in a muffle furnace at 600° C. for 4 h to obtain a La—Y/$CeO_2$ catalyst. A molar ratio of the $CeO_2$ to the $La(NO_3)_3 \cdot 6H_2O$ to the $Y(NO_3)_3 \cdot 6H_2O$ was 8.9:1:1.5.

e) The pre-calcined catalyst was pulverized and sieved. 1.00 mL of particles with a particle size of 60 mesh were placed in a 10 mm quartz tube. The quartz tube was placed in an electric tube furnace. The catalyst was sulfurized at 550° C. at a heating rate of 10° C./min in a mixed gas including 6% of CO, 3% of $SO_2$ and the balance of $N_2$ by volume at an air speed of 6,000 $h^{-1}$ for 2 h to obtain a sulfurized catalyst.

Comparative Example 1 a) 1.74 g of $Ce(NO_3)_3 \cdot 6H_2O$ and 16 g of NaOH were respectively dissolved in 35 mL and 30 mL of $H_2O$ to obtain a $Ce(NO_3)_3 \cdot 6H_2O$ solution and a NaOH solution. The NaOH solution was slowly added dropwise into the $Ce(NO_3)_3 \cdot 6H_2O$ solution to obtain a mixed solution. The mixed solution was stirred on a magnetic stirrer for 30 min to obtain a mixed solution 1.

b) 0.1 g of CTAB and 0.1 g of SDS were dissolved in 5 mL of distilled water to obtain a solution. The solution was added dropwise into the mixed solution 1 for stirring for 12 h and then loaded into an autoclave for a hydrothermal reaction at 110° C. for 24 h.

c) Cooling was conducted to room temperature. Filtration was conducted to collect a white precipitate. The white precipitate was washed to neutral with deionized water. The washed white precipitate was dried in a drying oven at 60° C. for 12 h and then calcined in a muffle furnace at 500° C. for 5 h to obtain a $CeO_2$ nanorod.

d) The pre-calcined $CeO_2$ nanorod was pulverized and sieved. 1.00 mL of particles with a particle size of 60 mesh were placed in a 10 mm quartz tube. The quartz tube was placed in an electric tube furnace.

e) The catalyst was sulfurized at 550° C. at a heating rate of 10° C./min in a mixed gas including 6% of CO, 3% of $SO_2$ and the balance of $N_2$ by volume at an air speed of 6,000 $h^{-1}$ for 2 h to obtain a sulfurized catalyst.

Comparative Example 2 a) 1.74 g of $Ce(NO_3)_3 \cdot 6H_2O$ and 16 g of NaOH were respectively dissolved in 35 mL and 30 mL of $H_2O$ to obtain a $Ce(NO_3)_3 \cdot 6H_2O$ solution and a NaOH solution. The NaOH solution was slowly added dropwise into the $Ce(NO_3)_3 \cdot 6H_2O$ solution to obtain a mixed solution. The mixed solution was stirred on a magnetic stirrer for 30 min to obtain a mixed solution 1.

b) 0.1 g of CTAB and 0.1 g of SDS were dissolved in 5 mL of distilled water to obtain a solution. The solution was added dropwise into the mixed solution 1 for stirring for 12 h and then loaded into an autoclave for a hydrothermal reaction at 110° C. for 24 h.

c) Cooling was conducted to room temperature. Filtration was conducted to collect a white precipitate. The white precipitate was washed to neutral with deionized water. The washed white precipitate was dried in a drying oven at 60° C. for 12 h and then calcined in a muffle furnace at 500° C. for 5 h to obtain a $CeO_2$ nanorod.

d) 0.62 g of $La(NO_3)_3 \cdot 6H_2O$ was dissolved in distilled water to obtain a mixed solution. 25% ammonia was added. Stirring was conducted for 2 h to adjust the pH of the mixed solution to 12. Then stirring was conducted at a constant speed at room temperature for 1 h to obtain a mixed solution.

e) 0.8 g of the $CeO_2$ nanorod was added into the mixed solution obtained in step d). The mixed solution was placed on a magnetic stirrer for stirring at a constant speed at 30° C. for about 4 h and then heated to 80° C. Stirring was conducted continuously until the pH was about 7 to obtain a catalyst. The catalyst was dried at 120° C. for 12 h and then calcined in an air atmosphere in a muffle furnace at 500° C. for 4 h to obtain a La/$CeO_2$ catalyst. A molar ratio of the $CeO_2$ to the $La(NO_3)_3 \cdot 6H_2O$ was 6.5:2.

f) The pre-calcined catalyst was pulverized and sieved. 1.00 mL of particles with a particle size of 60 mesh were placed in a 10 mm quartz tube. The quartz tube was placed in an electric tube furnace.

g) The catalyst was sulfurized at 550° C. at a heating rate of 10° C./min in a mixed gas including 6% of CO, 3% of $SO_2$ and the balance of $N_2$ by volume at an air speed of 6,000 $h^{-1}$ for 2 h to obtain a sulfurized catalyst.

Comparative Example 3 a) 1.74 g of $Ce(NO_3)_3 \cdot 6H_2O$ and 16 g of NaOH were respectively dissolved in 35 mL and 30 mL of $H_2O$ to obtain a $Ce(NO_3)_3 \cdot 6H_2O$ solution and a NaOH solution. The NaOH solution was slowly added dropwise into the $Ce(NO_3)_3 \cdot 6H_2O$ solution to obtain a mixed solution. The mixed solution was stirred on a magnetic stirrer for 30 min to obtain a mixed solution 1.

b) 0.1 g of CTAB and 0.1 g of SDS were dissolved in 5 mL of distilled water to obtain a solution. The solution was added dropwise into the mixed solution 1 for stirring for 12 h and then loaded into an autoclave for a hydrothermal reaction at 110° C. for 24 h.

c) Cooling was conducted to room temperature. Filtration was conducted to collect a white precipitate. The white precipitate was washed to neutral with deionized water. The washed white precipitate was dried in a drying oven at 60° C. for 12 h and then calcined in a muffle furnace at 500° C. for 5 h to obtain a $CeO_2$ nanorod.

d) 0.86 g of $Y(NO_3)_3 \cdot 6H_2O$ was dissolved in distilled water to obtain a mixed solution. 25% ammonia was added. Stirring was conducted for 2 h to adjust the pH of the mixed solution to 12. Then stirring was conducted at a constant speed at room temperature for 1 h to obtain a mixed solution.

e) 0.8 g of the $CeO_2$ nanorod was added into the mixed solution obtained in step d). The mixed solution was placed on a magnetic stirrer for stirring at a constant speed at 30° C. for about 4 h and then heated to 80° C. Stirring was conducted continuously until the pH was about 7 to obtain a catalyst. The catalyst was dried at 120° C. for 12 h and then calcined in an air atmosphere in a muffle furnace at 500° C. for 4 h to obtain a Y/$CeO_2$ catalyst. A molar ratio of the $CeO_2$ to the $Y(NO_3)_3 \cdot 6H_2O$ was 6.2:3.

f) The pre-calcined catalyst was pulverized and sieved. 1.00 mL of particles with a particle size of 60 mesh were placed in a 10 mm quartz tube. The quartz tube was placed in an electric tube furnace.

g) The catalyst was sulfurized at 550° C. at a heating rate of 10° C./min in a mixed gas including 6% of CO, 3% of $SO_2$ and the balance of $N_2$ by volume at an air speed of 6,000 $h^{-1}$ for 2 h to obtain a sulfurized catalyst.

Performance Test

The performance of a catalyst was tested by using a device shown in FIG. 1. 1 mL of a pre-sulfurized La—Y/$CeO_2$ catalyst was placed in a 10 mm quartz tube 7. The quartz tube 7 was fixed to a catalyst fixed bed 9 and then placed in a high-temperature electric tube furnace 8. A reaction was conducted in a flue gas including 1% of $SO_2$, 2% of CO and 97% of $N_2$ at a volumetric air speed of 12,000 $h^{-1}$. The reaction was conducted at a heating rate of 10° C./min and a temperature of 300° C., 350° C., 400° C., 450° C. and 500° C. separately. According to a program of the high-temperature tube furnace 8, heating was conducted to a target temperature, and then heat preservation was conducted. After the temperature was table, a tail gas was detected. The concentration of $SO_2$ was tested by using a sulfur dioxide analyzer 12. The concentration of COS was tested by using a gas chromatograph 13 (Thermo Fisher Scientific Co., Ltd.). Sulfur vapor was discharged from a gas outlet of the high-temperature tube furnace 8. Heat of the sulfur vapor was preserved with a heating belt. Then the sulfur vapor was condensed into sulfur in a cold trap 10. After the reaction was completed, 100-120 mL of $CS_2$ was added into the cold trap 10 and shaken up and down for completely dissolving the sulfur in a $CS_2$ solution. An obtained mixed solution was placed in a distillation flask. The distillation flask was heated at 50° C. in a water bath kettle. The $CS_2$ was vaporized after being heated to obtain vapor. The vapor entered a condenser through a branch tube and was condensed in a conical flask. After distillation was completed, sulfur obtained in the distillation flask was collected.

Conversion rate % =

$$\frac{\text{Concentration of } SO_2 \text{ at inlet} - \text{Concentration of } SO_2 \text{ at outlet}}{\text{Concentration of } SO_2 \text{ at inlet}} * 100\%$$

$$\text{Selectivity \%} = \frac{\begin{array}{c}\text{Concentration of } SO_2 \text{ at inlet} - \\ \text{Concentration of } SO_2 \text{ at outlet} - \\ \text{Concentration of } COS \text{ at outlet}\end{array}}{\text{Concentration of } SO_2 \text{ at inlet}} * 100\%$$

Test results are as follows.

| Sample | Reaction temperature (° C.) | Conversion rate of $SO_2$ (%) | Selectivity of elemental S (%) |
|---|---|---|---|
| Example 1 | 300 | 68.2% | 62.3% |
| | 350 | 85.3% | 80.1% |
| | 400 | 97.6% | 92.1% |
| | 450 | 97.3% | 92.5% |
| | 500 | 97.8% | 93.4% |
| Example 2 | 300 | 64.5% | 59.8% |
| | 350 | 82.6% | 77.9% |
| | 400 | 95.4% | 91.3% |
| | 450 | 96.7% | 93.5% |
| | 500 | 96.4% | 92.9% |
| Example 3 | 300 | 66.3% | 62.7% |
| | 350 | 79.8% | 74.8% |
| | 400 | 95.7% | 91.5% |
| | 450 | 96.2% | 93.5% |
| | 500 | 96.7% | 93.7% |
| Example 4 | 300 | 66.3% | 61.6% |
| | 350 | 84.5% | 80.1% |
| | 400 | 97.1% | 93.5% |
| | 450 | 97.2% | 94.1% |
| | 500 | 96.9% | 92.9% |
| Comparative Example 1 | 300 | 32.6% | 28.4% |
| | 350 | 50.8% | 45.9% |
| | 400 | 62.7% | 58.5% |
| | 450 | 67.8% | 63.3% |
| | 500 | 74.4% | 70.6% |
| Comparative Example 2 | 300 | 41.8% | 37.4% |
| | 350 | 53.3% | 48.2% |
| | 400 | 66.9% | 63.1% |
| | 450 | 72.6% | 67.9% |
| | 500 | 84.8% | 81.4% |
| Comparative Example 3 | 300 | 37.4% | 31.6% |
| | 350 | 46.7% | 42.4% |
| | 400 | 67.5% | 61.7% |
| | 450 | 79.4% | 75.3% |
| | 500 | 82.1% | 78.3% |

What is claimed is:

1. A method for preparing a catalyst for catalytic reduction of an industrial flue gas $SO_2$ with CO, comprising the following steps:
   a) respectively dissolving $Ce(NO_3)_3 \cdot 6H_2O$ and NaOH in water to obtain a $Ce(NO_3)_3 \cdot 6H_2O$ aqueous solution and a NaOH aqueous solution, and slowly adding the NaOH aqueous solution dropwise into the $Ce(NO_3)_3 \cdot 6H_2O$ aqueous solution for uniform mixing to obtain a mixed solution 1;
   b) dissolving cetyl trimethyl ammonium bromide (CTAB) and sodium dodecyl sulfonate (SDS) in water to obtain a solution, slowly adding the solution into the mixed solution 1 for stirring for 12-15 h, and conducting a hydrothermal reaction at a temperature of 100-110° C. for 24-26 h;
   c) cooling a reactant obtained after the hydrothermal reaction in step b) to room temperature, filtering the cooled reactant to collect a white precipitate, and sequentially washing, drying and calcining the white precipitate to obtain a $CeO_2$ nanorod;
   d) dissolving $La(NO_3)_3 \cdot 6H_2O$ and $Y(NO_3)_3 \cdot 6H_2O$ in water to obtain a mixed solution 2, and adjusting a pH of the mixed solution 2 to 12; adding the $CeO_2$ nanorod obtained in step c) into the mixed solution 2, placing the mixed solution 2 on a magnetic stirrer for stirring at a constant speed at 30-40° C. for about 4-6 h, heating the mixed solution to 80-90° C., and continuously stirring the mixed solution until the solution is neutral to obtain a catalyst; and drying the catalyst, and calcining the dried catalyst in an air atmosphere in a muffle furnace at 500-600° C. for 4-6 h to obtain a La-Y/$CeO_2$ catalyst; and
   e) pulverizing and sieving the La-Y/$CeO_2$ catalyst, placing particles with a particle size of 60-80 mesh in a quartz tube, and placing the quartz tube in an electric tube furnace; and then conducting sulfurization at 550-600° C. at a heating rate of 5-15° C./min in a mixed gas comprising 1-10% of CO, 1-10% of $SO_2$ and the balance of $N_2$ by volume at an air speed of 5,000-8,000 $h^{-1}$ for 1-4 h to obtain a target product sulfurized catalyst.

2. The method according to claim 1, wherein, in step a), a mass ratio of the $Ce(NO_3)_3 \cdot 6H_2O$ to the NaOH in the mixed solution is (0.1-5):(10-50).

3. The method according to claim 1, wherein, in step b), a mass ratio of the $Ce(NO_3)_3 \cdot 6H_2O$ to the CTAB to the SDS is (10-30):(0.1-3):(0.1-3).

4. The method according to claim 1, wherein, a molar ratio of the $Ce(NO_3)_3 \cdot 6H_2O$ to the $La(NO_3)_3 \cdot 6H_2O$ to the $Y(NO_3)_3 \cdot 6H_2O$ is (6-12):(0.5-1.5):(1-3).

5. A catalyst for catalytic reduction of an industrial flue gas $SO_2$ with CO, prepared by using the following method:
   a) respectively dissolving $Ce(NO_3)_3 \cdot 6H_2O$ and NaOH in water to obtain a $Ce(NO_3)_3 \cdot 6H_2O$ aqueous solution and a NaOH aqueous solution, and slowly adding the NaOH aqueous solution dropwise into the $Ce(NO_3)_3 \cdot 6H_2O$ aqueous solution for uniform mixing to obtain a mixed solution 1;
   b) dissolving cetyl trimethyl ammonium bromide (CTAB) and sodium dodecyl sulfonate (SDS) in water to obtain a solution, slowly adding the solution into the mixed solution 1 for stirring for 12-15 h, and conducting a hydrothermal reaction at a temperature of 100-110° C. for 24-26 h;
   c) cooling a reactant obtained after the hydrothermal reaction in step b) to room temperature, filtering the cooled reactant to collect a white precipitate, and sequentially washing, drying and calcining the white precipitate to obtain a $CeO_2$ nanorod;
   d) dissolving $La(NO_3)_3 \cdot 6H_2O$ and $Y(NO_3)_3 \cdot 6H_2O$ in water to obtain a mixed solution 2, and adjusting a pH of the mixed solution 2 to 12; adding the $CeO_2$ nanorod obtained in step c) into the mixed solution 2, placing the mixed solution 2 on a magnetic stirrer for stirring at a constant speed at 30-40° C. for about 4-6 h, heating the mixed solution to 80-90° C., and continuously stirring the mixed solution until the solution is neutral to obtain a catalyst; and drying the catalyst, and calcining the dried catalyst in an air atmosphere in a muffle furnace at 500-600° C. for 4-6 h to obtain a La-Y/$CeO_2$ catalyst; and
   e) pulverizing and sieving the La-Y/$CeO_2$ catalyst, placing particles with a particle size of 60-80 mesh in a quartz tube, and placing the quartz tube in an electric tube furnace; and then conducting sulfurization at 550-600° C. at a heating rate of 5-15° C./min in a mixed gas comprising 1-10% of CO, 1-10% of $SO_2$ and the balance of $N_2$ by volume at an air speed of 5,000-8,000 $h^{-1}$ for 1-4 h to obtain a target product sulfurized catalyst.

6. The catalyst according to claim 5, wherein, in step a), a mass ratio of the $Ce(NO_3)_3 \cdot 6H_2O$ to the NaOH in the mixed solution is (0.1-5):(10-50).

7. The catalyst according to claim 5, wherein, in step b), a mass ratio of the $Ce(NO_3)_3 \cdot 6H_2O$ to the CTAB to the SDS is (10-30):(0.1-3):(0.1-3).

8. The catalyst according to claim 5, wherein, a molar ratio of the $CeO_2$ to the $La(NO_3)_3 \cdot 6H_2O$ to the $Y(NO_3)_3 \cdot 6H_2O$ is (6-12):(0.5-1.5):(1-3).

9. A method of using the catalyst prepared by using the method according to claim 1 in catalytic reduction of an industrial flue gas $SO_2$ with CO to prepare sulfur, comprising: placing 1 mL of a sulfurized catalyst in a 10 mm quartz tube, and placing the quartz tube in an electric tube furnace for a reaction at a temperature of 300-500° C. at a heating rate of 5-15° C./min in a flue gas comprising 0.5-4% of $SO_2$, 1-8% of CO and 88-98.5% of $N_2$ at a volumetric air speed of 12,000-15,000 $h^{-1}$; and discharging sulfur vapor from a gas outlet of the tube furnace, preserving heat of the sulfur vapor with a heating belt, and condensing the sulfur vapor into sulfur in a cold trap.

10. The method according to claim 9, wherein, after the reaction is completed, 100-120 mL of $CS_2$ is added into the cold trap and shaken up and down for completely dissolving the sulfur in a $CS_2$ solution, an obtained mixed solution is placed in a distillation flask, and the distillation flask is heated at 50-60° C. in a water bath kettle; the $CS_2$ is vaporized after being heated to obtain vapor, and the vapor enters a condenser through a branch tube and is condensed in a conical flask; and sulfur obtained in the distillation flask is collected.

11. The method according to claim 2, wherein, in step a), a mass ratio of the $Ce(NO_3)_3 \cdot 6H_2O$ to the NaOH in the mixed solution is (1.5-5):(10-40).

12. The method according to claim 3, wherein, in step b), a mass ratio of the $Ce(NO_3)_3 \cdot 6H_2O$ to the CTAB to the SDS is (10-25):(0.5-1.5):(0.5-1.5).

13. The catalyst according to claim 6, wherein, in step a), a mass ratio of the $Ce(NO_3)_3 \cdot 6H_2O$ to the NaOH in the mixed solution is (1.5-5):(10-40).

14. The catalyst according to claim 7, wherein, in step b), a mass ratio of the $Ce(NO_3)_3 \cdot 6H_2O$ to the CTAB to the SDS is (10-25):(0.5-1.5):(0.5-1.5).

* * * * *